DOUGLAS J BRIDGEFORD
INVENTOR.

DOUGLAS J BRIDGEFORD
INVENTOR.

_United States Patent Office_

3,531,465
Patented Sept. 29, 1970

3,531,465
PREPARATION OF ORGANIC DERIVATIVES FROM DECAUSTICIZED XANTHATES
Douglas J. Bridgeford, Danville, Ill., assignor to Tee-Pak, Inc., Chicago, Ill., a corporation of Illinois
Continuation-in-part of application Ser. No. 416,795, Dec. 8, 1964, which is a continuation-in-part of application Ser. No. 200,621, June 7, 1962. This application Aug. 21, 1968, Ser. No. 754,447
Int. Cl. C08b 9/00, 21/18
U.S. Cl. 260—214                           13 Claims

ABSTRACT OF THE DISCLOSURE

Various organic derivatives are prepared by reaction of a decausticized polymeric alcohol xanthate, either as a dried powder or as a solution in an inert aqueous or non-aqueous medium, by nucleophilic addition or displacement reaction with an electrophilic material. By use of decausticized polymeric xanthates it is possible to carry out nucleophilic addition or displacement reactions in high yield with substantial elimination of by-products other than those originating in the nucleophilic reaction. In some cases, the best nucleophilic reactions require the use of polymeric xanthate which is not only decausticized but also substantially deionized.

Typical nucleophilic reactions carried out in accordance with this invention involves the reaction of decausticized cellulose xanthate, amylose xanthate, starch xanthate, dextran xanthate, polyvinyl alcohol xanthate, polyallyl xanthate, etc. Either as a dry solid or in aqueous or non-aqueous solution with electrophilic reagents such as alkyl halides, isocyanates, nitriles, acyl halides, various halogenated organic compounds, etc.

CROSS REFERENCE TO RELATED APPLICATIONS

This application is a continuation-in-part of applicant's co-pending application Ser. No. 416,795 filed Dec. 8, 1964, now U.S. Pat. 3,399,069 which is in turn a continuation-in-part of application Ser. No. 200,621, filed June 7, 1962, now U.S. Pat. 3,291,789.

BACKGROUND OF THE INVENTION

Field of the invention

This invention relates to the production of various organic derivatives by nucleophilic displacement or addition reactions. The xanthate functional group has been found to be one of the most powerful nucleophiles in the field of organic chemistry. Xanthate compounds, however, are relatively unstable and generally require the presence of a substantial amount of alkali to produce stable aqueous solutions, such as viscose. Xanthate compounds may be used in a variety of nucleophilic reactions but are quite inefficient for this purpose when the reactions are carried out under conditions of high pH or in presence of substantial amounts of competing nucleophilic by-products, such as trithiocarbonates and the like.

Description of the prior art

The theory of nucleophilic displacement and addition reactions is discussed in a variety of modern organic chemistry texts, e.g. Mechanisms of Organic Reactions, R. Breslow and Nucleophilic Substitution at a Saturated Carbon Atom, C. A. Bunton. The prior art, however, has not considered the effect of high pH and competing nucleophilic impurities in nucleophilic displacement and addition reactions involving xanthate compounds. Applicant, in his prior U.S. Pat. 3,291,789 and U.S. patent application Ser. No. 416,795, now U.S. Pat. 3,399,069 has disclosed a variety of processes for preparing decausticized polymeric xanthates and relatively stable solid products thereof. Applicant has also disclosed in his aforementioned patent and patent application the use of decausticized xanthates in the preparation of various organic derivatives.

SUMMARY OF THE INVENTION

This invention comprises a new and improved process for the preparation of a variety of organic derivatives by nucleophilic displacement and addition reactions of polymeric xanthates with electrophilic reagents. The xanthates which are used as nucleophilic reactants are decausticized by any of a variety of processes and may be used in a dry solid powdered form or in solution in aqueous or non-aqueous solvents which are inert under the conditions of reaction. The polymeric xanthates which are used are preferably not only decausticized but also substantially deionized to remove nucleophilic by-products produced in the preparation or further treatment of the polymeric xanthates. Decausticized and/or deionized polymeric xanthates, both in the form of solids and solutions in aqueous or non-aqueous media, have been reacted by nucleophilic displacement and addition with a variety of electrophilic reagents including aldehydes, isocyanates, cyanamide, thiourea, thiosulfates, ethyleneimine, oxirane derivatives, acyl halides, alkyl halides, etc.

BRIEF DESCRIPTION OF THE DRAWING

In the accompanying drawings, to be taken as a part of the specification, there are clearly and fully illustrated several examples, of spray-drying processes and/or apparatus which may be used in the preparation of dry, solid polymeric xanthates used in accordance with this invention, in which drawings.

GENERAL DESCRIPTION OF PREPARATION OF XANTHATE REACTANTS

Figure 1:
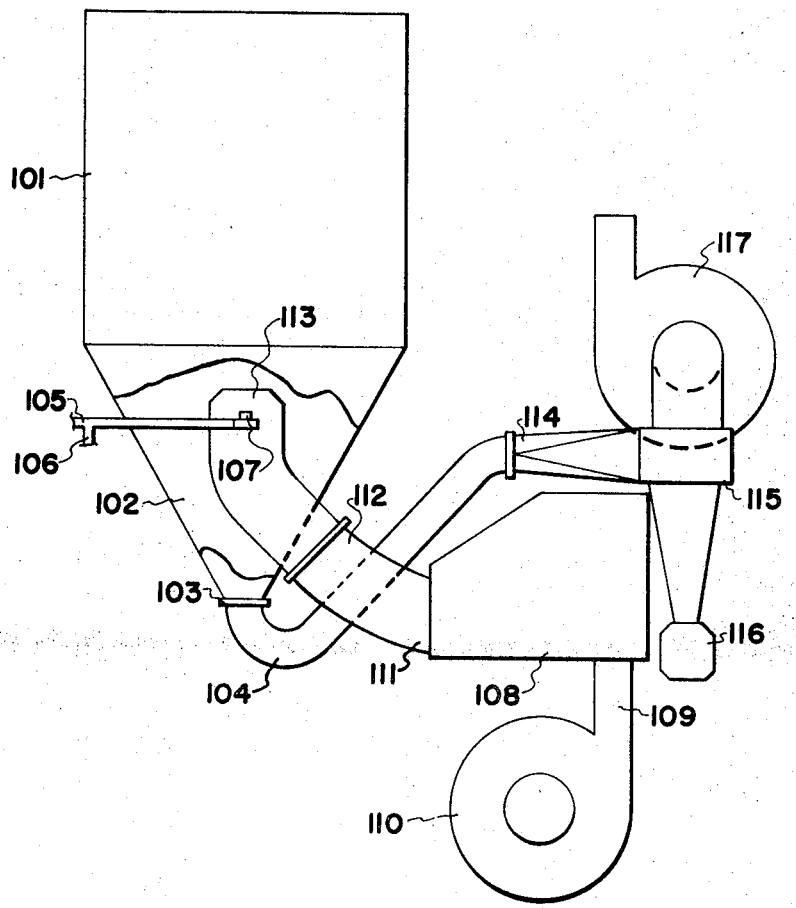
FIG. 1 is a diagrammatic view of a concurrent or parallel flow, up-flow type spray dryer.
Figure 2:
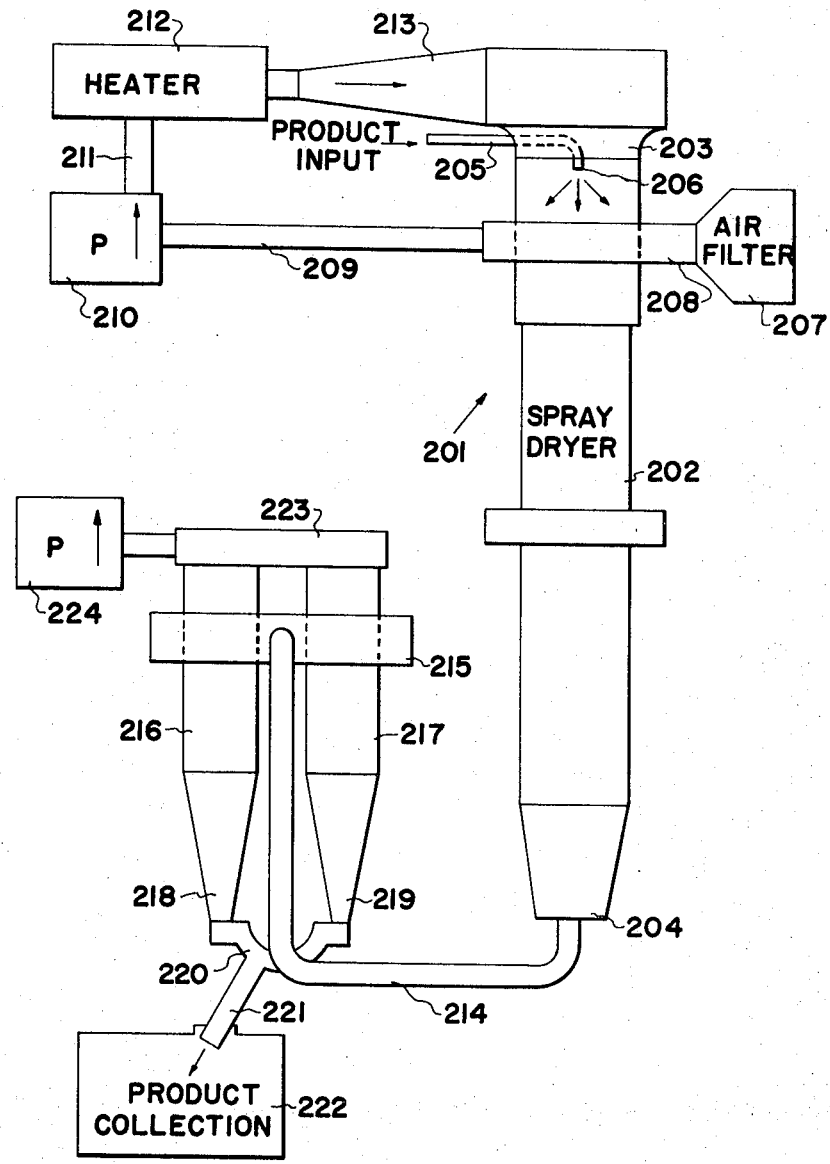
FIG. 2 is a diagrammatic view of a down-flow type, parallel flow spray dryer used in drying various xanthate solutions in accordance with this invention.
Figure 3:
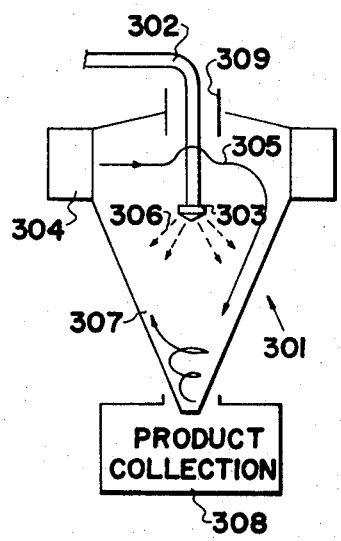
FIG. 3 is a diagrammatic view of a mixed-flow type spray dryer which can be used in drying various xanthate solutions in accordance with this invention.
Figure 4:
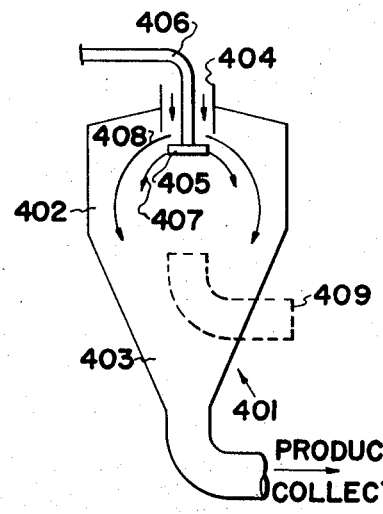
FIG. 4 is a diagrammatic view of another type of vertical, down-flow concurrent spray dryer.
Figure 5:
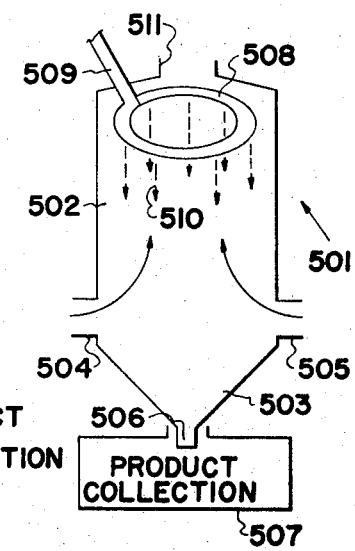
FIG. 5 is a diagrammatic view of a vertical, up-flow counter-current type spray dryer.

Viscose has been known as an intermediate in the preparation of cellulose compositions for about 70 years. Cellulose xanthate was discovered by Cross and Bevan in 1892 and is prepared by the reaction of carbon disulfide with alkali cellulose. A dilute aqueous alkaline solution of cellulose xanthate is known as viscose and consists of a mixture of sodium cellulose xanthates of varying molecular size, loosely combined with sodium hydroxide and dispersed in the solution together with alkalization and xanthation by-products.

In commercial production, viscose is allowed to age until it reaches the desired ripeness and is then extruded through a die into a coagulating and/or regenerating medium (e.g. ammonium sulfate and/or sulfuric acid) to regenerate cellulose having the configuration of the die through which the viscose was extruded. If the viscose is extruded through a fine hole a filament of rayon is produced. If the viscose is extruded through a narrow slit, a film of regenerated cellulose is produced. If the viscose is extruded through a thin annular opening a tubular film of regenerated cellulose is produced which may be used as an artificial sausage casing. Viscose has also been used for impregnating paper or fabric (including non-woven fabrics and webs) for regenerating cellulose therein by subsequent treatment with acid.

Attempts have also been made to regenerate viscose thermally to avoid the necessity for acid resistant equipment which is required in acid regeneration processes. The acid regeneration of viscose and the thermal regeneration of viscose both result in the formation of large amounts of salts and other undesirable by-products similar in weight to the cellulose which necessitate extensive washing and purification of the regenerated cellulose.

Polymeric alcohols, including carbohydrates and polysaccharides, such as starch, amylose, dextran, sugars, polyvinyl alcohol, polyally alcohol, etc., are known to form alkali derivatives from which the corresponding xanthates can be prepared by reaction with carbon disulfide. The purification of these materials and regeneration of products therefrom present economic and technical problems which are similar to the purification and regeneration of cellulose from viscose.

In my U.S. Pat. 3,291,789, there are described several inexpensive processes for decausticizing various polymeric alcohol xanthates. In that patent there are described processes in which alkaline solutions of various polymeric alcohol xanthates are decausticized by dialysis or by treatment with ion exchange or ion retardation materials.

Solutions of polymeric alcohol xanthates which have been decausticized as described in my prior patent are especially useful as wet and dry strength additives for paper and for various other purposes as described in said patent. Decausticized polymeric alcohol xanthate solutions can be regenerated into films or filaments or tubular casings by treatment with acid and/or by thermal regeneration. These decausticized solutions, however, contain such a high proportion of water that it has been uneconomical to manufacture such solutions for commerical use at any location other than the place at which the xanthate solution was prepared. Also, it has been found that decausticized xanthate solutions tend to decompose, lose xanthate sulfur, and gradually become insoluble after storage for extended periods of time. The decomposition of the xanthate groups is accelerated at higher temperatures. It has thus been necessary to refrigerate decausticized polymeric alcohol xanthate solutions if they are to be stored for any extended period of time.

While the decausticized polymeric alcohol xanthate solutions described in U.S. Pat. 3,291,789 are useful for a variety of purposes, the problems of storage and cost of shiping excessive amounts of water have retarded the commercial use of these materials. It has been considered highly desirable to find some economic means to convert these materials into a dry, solid form which is stable for extended periods of storage and which can be reconstituted by mixture with or dispersion in water or other solvent. The dry, solid polymeric xanthate products produced in accordance with co-pending application Ser. No. 416,795, now U.S. Pat. 3,399,069 are especially useful both in solid form and in solution in carrying out the nucleophilic displacement and addition reactions of this invention.

In the preparation of viscose and other polymeric alcohol xanthates, many undesired by-products are formed. In the past, viscose and other polymeric alcohol xanthate solutions have been regenerated by treatment with an acid with the result that large amounts of salts are formed within the regenerated material. It was previously considered impractical to reduce the proportion of salts in the regenerated polymeric alcohol product by neutralization of the aqueous caustic solutions due to the fact that any attempt to neutralize excess caustic with acid would result in a localized region of very low pH and high salt concentration which would tend to coagulate the polysaccharide and produce a heterogeneous product.

In my prior U.S. Pat. 3,291,789, it is reported that polymeric alcohols, principally film-forming carbohydrates or polysaccharides, such as cellulose, starch, amylose, dextran, etc., in the form of their caustic xanthate solutions, can be decausticized by dialysis, ion exchange, and/or ion retardation. The varous procedures for decausticization of various xanthate solutions are described in considerable detail in that patent.

In my co-pending application Ser. No. 416,795, now U.S. Pat. 3,399,069 I have reported that decausticized solutions of polymeric alcohol xanthates, such as cellulose, starch, amylose, dextran, sugar, polyvinyl alcohol, polyallyl alcohol, etc., can be converted to finely divided solid, stable products by spray drying. The decausticized solutions (which have been decausticized to a pH less than 13) are subjected to spray drying using a large volume of very dry heated air, at a temperature of at least 38° C. to produce a powdered polymeric alcohol xanthate product which is substantially dry and has a D.S. of at least about 3%.

The term D.S. as used herein refers to the degree of substitution of the polymeric alcohol expressed as a percentage of available groups capable of substitution which are in fact substituted with the xanthate radical. Thus, a polyvinyl alcohol xanthate having a xanthate group for every ten vinyl groups would have a D.S. of 10%. A cellulose xanthate, however, containing one xanthate group for every ten anhydroglucose groups would have a D.S. of 3⅓% because cellulose can contain up to three xanthate substituents per anhydroglucose unit.

In my co-pending application Ser. No. 416,795, now U.S. Pat. 3,399,069 I have reported that decausticized xanthate solutions could be spray dried. Viscose is much more stable on extended storage, both at low and elevated temperatures, than is a solution of decausticized cellulose xanthate of the same cellulose content. I have found viscose, however, to be extremely unstable in spray drying. In fact, viscose loses most of its xanthate groups during spray drying and yields a substantially insoluble product. The sodium hydroxide present in viscose is quite damaging to the dried product. Sodium hydroxide is somewhat hygroscopic and thus more water is retained (making the product less stable) in spray dried viscose. Also, the sodium hydroxide present in spray dried viscose attacks cellulose and depolymerizes it.

The spray drying of decausticized polymeric alcohol xanthates can be accomplished using any of the several types of spray dryers which are in commercial use. Spray dryers which can be used in this process include the mixed flow type, horizontal-concurrent type, vertical up flow counter-current type, vertical down flow concurrent type, and vertical up flow concurrent type, although other comercial spray dryers can be used. In the spray drying of decausticized xanthate solutions, the solution is sprayed into a large volume high velocity stream of heated air or other inert gas. Air temperatures of at least 38° C. are required for effective drying and temperatures of the order of 260° C. can be used without excessive decomposition of the product. In fact, with proper adjustment of air flow rates and efficient product collection, it is possible to use air temperatures as high as 316° C. to 420° C.

It should be noted that even where high air temperatures are used the temperature surrounding each particle being dried is approximately the wet bulb temperature of the drying gas and thus the product is not subjected to temperatures substantially above the boiling point of water.

DESCRIPTION OF SPRAY DRYING APPARATUS USED IN PREPARING XANTHATE REAGENTS

In FIG. 1 there is shown a spray dryer which is supplied with the liquid to be dried from a pressure tank (not shown). The spray dryer includes drying chamber 101 having a conical outlet portion 102 opening through an outlet 103 to a collection conduit 104. The liquid feed is introduced into the dryer through inlet conduit 105 which is provided with inlet 106 for introduction of air or other gas to atomize the feed. Conduit 105 terminates at spray nozzle 107 in the dryer.

The dryer apparatus is provided with an air heater and filter 108 having inlet 109 connected to air supply fan 110 and an outlet 111 connected to conduit 112 which terminates at 113 in the dryer to provide a flow of heated air over the atomized solution which is to be dried.

Outlet conduit 104 from the base of the dryer is connected as at 114 to cyclone collector 115 which separates the dried powdered product from the air stream. Cyclone collector 115 is provided at its lower end with a product collection reservoir 116 and at its upper end is connected to exhaust fan 117.

The solution which is to be dried is placed in a supply tank from which it is forced under pressure to atomizing nozzle 107 in the dryer. A high pressure stream of air is introduced through inlet connection 106 and mixes with the solution in the atomizing nozzle. The air stream is effective to eject the solution in the form of a hollow cone shaped mist. The production rate of the apparatus is controlled by variation in pressure of the liquid feed and air streams.

Inlet fan 110 supplies air at room temperature (which may be predried) through filter and heater 108 which raises the air temperature to a value sufficient to dry the product being handled. The temperature of the air may range from 38° C. up to 316° C. or higher. The heated air is supplied through air inlet nozzle 113 in a blast which completely surrounds the cone shaped spray of liquid being treated. The atomized solution is carried upward in the drying chamber as a fine mist inside the blast of heated air.

As the cone shaped mist of solution mixes with the blast of hot air, the moisture is evaporated from the individual droplets. This evaporation of moisture causes the heated air stream to be cooled and maintains the surface temperature of the individual droplets at a level not substantially in excess of the wet bulb temperature of the air stream. The solid product in the spray, which may be finely divided hollow spherical particles, is protected from decomposition by the hot air stream by the reduction in temperature effected by evaporation of liquid from the particles.

The finely divided solid product and air are withdrawn from the drying chamber 101 through bottom outlet 103 and conduit 104. The air and product mixture passes into cyclone collector 115 where the solid product is separarated and collected in product collection receptacle 116. The air stream from cyclone collector 115 is withdrawn by exhaust fan 117 and discharged to atmosphere.

In FIG. 2 there is shown a spray dryer apparatus of a commercial type which is used for large scale production of various spray dried food products and which is particularly useful in the preparation of stable, dry, polymeric alcohol xanthate powders. In FIG. 2 there is a diagrammatic showing of a spray dryer 201 comprising tubular chamber 202 having an upper inlet portion 203 and a lower outlet portion 204. A solution which is to be spray dried is introduced through conduit 205 and sprayed into the upper end of chamber 202 by an atomizing nozzle 206. Air for the spray dryer is supplied through filter 207 and manifold 208 surrounding the upper end of dryer chamber 202. Manifold 208 is connected by conduit 209 through blower 210. Blower 210 is in turn connected by conduit 211 to heater 212 which supplies heated air to the inlet 213 of spray dryer 201.

The bottom outlet 204 of spray dryer 201 is connected by conduit 214 to manifold 215 which feeds twin cyclones 216 and 217. Cyclones 216 and 217 have outlets 218 and 219 connected to manifold 220 and conduit 221 leading to a product collection receptacle 222. The upper end of cyclones 216 and 217 are connected to manifold 223 which is connected to blower 224 discharging to atmosphere.

The solution being treated is introduced into spray dryer 201 through conduit 205 and atomizing nozzle 206. The solution is discharged in the form of a conical spray of very fine droplets. Air is supplied by blower 210 and is filtered (and predried, if desired) and heated prior to introduction into spray dryer. The air is supplied at any suitable drying temperature in the range from about 38° C. up to 482° C. In the spray dryer the atomized particles of solution are quickly dried into small particles of hollow spherical form. The evaporation of water (or other solvent) from the solution keeps the surface temperature of the dried particles at a value not substantially in excess of the wet bulb temperature of the heated air.

The flow of air and dried particulate product passes through conduit 214 into cyclones 216 and 217 where the product particles are separated and collected into receptacle 222. The air is then discharged to atmosphere through top or blower 224.

In FIGS. 3 to 7 of the drawings, there are shown examples of a number of different types of spray dryers which can be used in carrying out this invention.

In FIG. 3 there is shown a mixed-flow type spray dryer 301. In this type of dryer, the solution to be treated is fed through conduit 302 and sprayed into the dryer through atomizing nozzle 303.

The feed flows countercurrently to the air and partial drying occurs while the spray mixes with the drying gases. Heated air (which may be predried) is fed into the dryer through inlet 304 and follows the path of the line and arrow 305. The flow path of atomized solution is shown by dotted lines and arrows 306.

Spray dryer 301 is constructed with the bottom portion 307 constructed as a separator and discharging to a product collection receptacle 308. The air is withdrawn through outlet 309 after separation from the solid particulate product.

In this type of dryer the initial flow of the atomized solution is concurrent to the inlet air and countercurrent to the exhaust flow of the air. Part of the drying takes place while the spray is passing through the ascending exhaust air and the drying is completed while the spray travels concurrently with the descending heated inlet air. The outlet air temperature of this type of dryer is in most cases considerably lower than for other types of dryers which increases the efficiency of treatment of thermally sensitive materials.

In FIG. 4 there is shown a vertical down-flow concurrent type spray dryer. The dryer 401 has a main dryer portion 402 and a product collection portion 403 discharging to a product collection reservoir. Heated air (which may be predried) is introduced into dryer 401 through inlet 404 and flows past a spray of solution to be dried. The spray of solution is ejected at right angles to the air flow through nozzle 405 which is supplied by conduit 406 from the solution supply tank. The spray of solution being treated is shown by dotted lines and arrows 407 while the general path of heated air flow is shown by solid lines and arrows 408.

The heated air envelops the spray of material being dried and causes water to evaporate rapidly to produce a finely divided dried product. The solid product is removed in the separation portion of the dryer and the air is withdrawn from the dryer through outlet conduit 409 shown in dotted lines.

In FIG. 5 there is shown a vertical up-flow countercurrent type of spray dryer. Dryer 501 includes a dryer portion 502 and a collector portion 503. Dryer 501 is divided with inlets 504 and 505 for supplying heated air (which may be predried) countercurrently to the spray of liquid being treated. The collector portion 503 has an outlet 506 discharging into a product collection receptacle 507.

At the upper end of dryer 501 there is provided an atomizing nozzle 508 having a supply inlet conduit 509. Nozzle 508 is arranged to discharge a plurality of atomized streams of liquid as shown by dotted lines and arrows 510. At the upper end of the dryer there is provided an outlet opening 511 for withdrawal of gases from the dryer.

The vertical up-flow countercurrent type of dryer is quite efficient in drying but results in product classification. The larger particles which are dried by the air circulating through the dryer fall to the bottom of the chamber and are withdrawn into the product collection receptacle. Very fine particles are carried out through outlet 511 and require separation in a secondary separation system (not shown).

Figure 6:
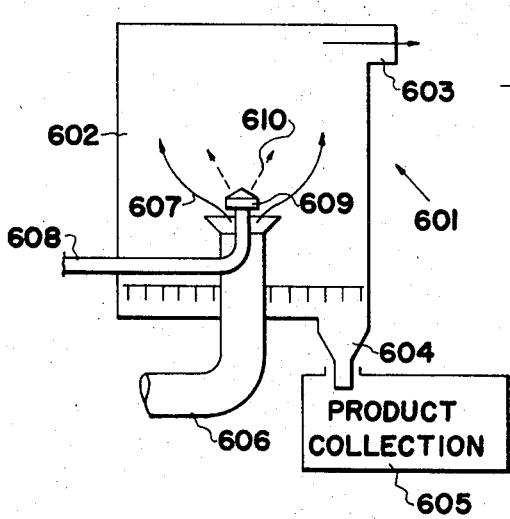
FIG. 6 is a diagrammatic view of a vertical up-flow concurrent type spray dryer.

In FIG. 6 there is shown a diagrammatic view of a vertical up-flow concurrent type of spray dryer. In this apparatus dryer 601 comprises dryer chamber 602 having outlet 603 for discharge of air and outlet 604 discharging to a product collection receptacle 605.

Heated air (which may be predried) is introduced into the dryer through conduit 606 as shown by solid lines and arrows 607. The liquid product to be treated is introduced through conduit 608 and atomized at nozzle 609 as shown by dotted lines and arrows 610.

In this type of dryer both the air and the atomized liquid to be treated enter at the bottom of the chamber. The liquid is sprayed in a form of a hollow cone which is enveloped by the heated air flowing through the dryer. The air is maintained at a temperature ranging from 38° C. up to 482° C. depending upon the product being treated. The up-flow of air results in product classification as the large particles fall to the bottom of the chamber and are removed to product collection receptacle 605 while the product fines are withdrawn with the air through outlet 603. This arrangement requires the use of a secondary separator system for recovery of product fines and to prevent air pollution.

Figure 7:
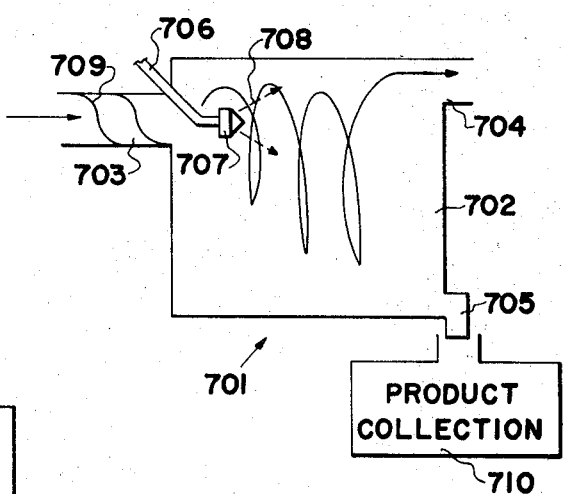
FIG. 7 is a diagrammatic view of a horizontal concurrent type spray dryer.

In FIG. 7 there is shown diagrammatically a horizontal concurrent type of spray dryer. Spray dryer 701 includes dryer chamber 702 having air inlet 703 and outlet 704 and product outlet 705.

The liquid being treated is introduced into the dryer through conduit 706 which atomizes the liquid through nozzle 707 in the form of a conical spray as indicated by dotted lines and arrows 708. The heated air (which may be predried) is introduced through inlet 702 and given a whirling motion by helical vanes 709.

In this type of dryer the liquid spray and air enter concentrically at the same end of the chamber. The air circulates around the spray of liquid particles in a whirling motion caused by helical vanes 709. The particles are quickly dried and settle to the bottom of the dryer where they are removed to the product collection receptacle 710. The air is withdrawn from the dryer through outlet 704. In this type of dryer the very fine product particles are carried out with the air and require a secondary separation system (not shown).

DESCRIPTION OF SPRAY DRIED XANTHATE REACTANTS USED IN THIS INVENTION

The following non-limiting examples are illustrative of several embodiments of the procedures used in preparing spray dried polymeric xanthate reagents for use in accordance with this invention:

EXAMPLES 1–42

Examples 1–25, 35, 36, 37, 39, 40, 43, 44, 48, 49, 54, 58, 59, 60, 65, 69, 76 and 78 of applicant's co-pending U.S. Pat. 3,399,069 are incorporated by reference herein as Examples 1–42 respectively.

DESCRIPTION OF THE PREFERRED EMBODIMENTS

Nucleophilic substitution and addition reactions are carried out using decausticized, and in some cases deionized, polymeric alcohol xanthates as nucleophilic reactants. These xanthates will react generally with any electrophilic reagent and produce derivatives by nucleophilic displacement and addition reaction. The decausticized polymeric alcohol xanthates are superior as nucleophilic reagents and are especially useful in carrying out reactions where high pH has a deleterious effect on the reaction. Also, the procedures used in preparing the decausticized polymeric alcohol xanthates are adaptable to removing impurities and by-products of the preparation of the xanthates which would often interfere in nucleophilic reactions. For example, one of the principal impurities in polymeric alcohol xanthates is the trithiocarbonate salt which is a powerful nucleophile and competes with the xanthate reactants and causes great inefficiency in nucleophilic reactions using the xanthates which have not been decausticized or deionized. The decausticized polymeric alcohol xanthates may be used as nucleophilic reactants in aqueous media and may also be used in solid form as a slurry or dispersion for reaction with the desired electrophilic reagent.

In carrying out the process of this invention any of a variety of polymeric alcohol xanthates may be used, such as alkaline solutions of cellulose xanthate, amylose xanthate, starch xanthate, dextran xanthate, polysaccharide xanthates, polyvinyl alcohol xanthate, polyallyl alcohol xanthate, etc., from which alkali has been removed as described in my aforementioned patent. Also, these decausticized xanthates may be used as nucleophilic reagents in the form of dry powdered materials which may be produced by spray drying as described in my co-pending application Ser. No. 416,795, now U.S. Pat. 3,399,069. The spray dried powdered decausticized polymeric alcohol xanthates may be used either in solid form or dissolved in water or other solvents for carrying out nucleophilic addition and substitution reactions.

In carrying out nucleophilic substitution and addition reactions using decausticized or deionized polymeric alcohol xanthates, any electrophilic reagents may be reacted therewith. Suitable electrophilic reagents include aliphatic and aromatic aldehydes of all kinds, aliphatic and aromatic isocyanates, both mono-functional and poly-functionl, urea and thiourea, cyanamide, cyclic amines such as ethyleneimine and derivatives thereof, acyl halides, such as adipoyl chloride and monoacyl halides, halogenated organic compounds such as alkyl and aryl halides, halogenated acids such as chloro acetic acid and salts and esters thereof, halogenated silanes, such as trimethylchloro silane, etc. In general, any organic compound having an electrophilic structure is suitable as a reagent for a reaction with decausticized polymeric alcohol xanthates under suitable reaction conditions.

The reactions between the polymeric alcohol xanthates, as nucleophilic reagents, and suitable electrophilic reactants may be carried out in aqueous or non-aqueous solution. In some cases it is desired to eliminate competing reactions with nucleophilic impurities and essentially deionized xanthate solutions are required. The nucleophilic impurities, such as sulfides and trithio carbonates, are easily removed from the various polymeric alcohol solutions by subjecting the solutions to a combined cation and anion exchange treatment. The two-step cation and anion exchange treatment is effective to remove both the metal cations and the undesirable reactive nucleophilic anions from the solution. Another treatment which has been found effective is to pass the aqueous alkaline solution of polymeric alcohol xanthate, containing by-product and impurity ions, through a cation exchanger in the hydrogen ion form for a time sufficient to reduce the pH of the solution below pH 7 and preferably in the range of about pH 5 to 6.5. When the pH of the solution is reduced below about pH 7 the by-product anions such as the sulfide and trithio carbonate are converted to gases which can be released from the solution by sparging with an inert gas. When the solution is sparged with an inert gas the sulfide and thio carbonates are removed in the form of hydrogen sulfide and carbondisulfide, along with minor amounts of carbondioxide and carbonyl sulfide. It has also been found that if the solution of polymeric alcohol xanthate is treated in a cation exchanger to reduce the pH below 7 prior to spray drying, by the procedure set forth in my copending application Ser. No. 416,795, now U.S. Pat. 3,399,069 the spray drying operation not only removes the water from the solution and produces the xanthates as a dry powder but also volatilizes the impurities out of the solution in the form of hydrogen sulfide, carbondisulfide, carbon dioxide, and carbonyl sulfide gases.

In the following non-limiting examples there are described a number of applications of the decausticized polymeric alcohol xanthates, both as solutions and as dry powders, in nucleophilic displacement and addition reactions. For convenience, the various examples of this process are grouped with sub-titles relating to the electrophilic reagents used in the reaction or, in some cases, the end product of the reaction.

XANTHATE-ISOCYANATE REACTIONS

Example 43

A dried Erlenmeyer flask was charged with 100 g. carbon tetrachloride at 25° C. Next, 5 ml. of phenylisocyanate was dissolved in the carbontetrachloride and 8 drops of Triton X–100 added thereto. A 200 g. portion of 0.5% cellulose content, cellulose xanthate solution was added to a Waring blender and set at slow speed. The cellulose xanthate solution had been decausticized by passing it through a cation exchange column in the hydrogen ion form as described above until sufficient alkali was removed to reduce the pH of 8. At pH 8 substantially all free alkali has been removed from the solution, the mildly alkaline pH being due to alkali released by partial hydrolysis of the xanthate.

The carbontetrachloride solution of phenylisocyanate was added to the Waring blender over a period of about 1 minute. The emulsion was stirred 1 minute and acetic acid was added to adjust the pH of 4.5. The blending operation was continued for 10 minutes longer as the solution rose to 22° C.

The blender contents were then poured into a beaker and allowed to stand at 25° C. for about 72 hours. A white gel was recovered from the surface of the aqueous layer which consisted of a cellulose derivative, viz, the phenyl carbamyl anhydride of cellulose xanthate. The derivative obtained is produced by nucleophilic attack by the xanthate group on the carbon atom in the isocyanate group.

Example 44

A nucleophilic reaction of cellulose xanthate and phenylisocyanate was carried out in entirely aqueous media.

A solution of 0.5% cellulose content cellulose xanthate was prepared and passed through a cation exchange column in the hydrogen ion form to produce a decausticized solution of pH 8.2. About 3 ml. of phenylisocyanate was placed on the bottom of a 50 ml. beaker. Next, 20 ml. of the decausticized celulose solution was placed over the phenylisocyanate. Within 30 seconds, a turbid skin was seen to arise on the phenylisocyanate interface. The product of the interfacial reaction was a phenyl carbamyl derivative of cellulose xanthate.

Example 45

A solution of about 5% phenylisocyanate was made in acetone. A equal volume of pH 8 decausticized cellulose xanthate solution was mixed with the acetone solution rapidly and allowed to stand. In about 1 minute the mass was seen to foam and a gel formed consisting of the same derivative produced in Examples 43 and 44.

Example 46

An aqueous solution was prepared by dissolving 40 g. spray dried decausticized (cation exchange treatment) cellulose xanthate in 1800 ml. water. Next, 14.7 g. of phenylisocyanate was added to the solution. Within 3 minutes of storing an ivory-white creamy gel dispersion or latex had formed. Since, at the xanthate level involved, only 7.7 g. of the phenylisocyanate would be required to react with the known amount of xanthate, and approximately 100% exces of reagent had been used. The mixture was allowed to stand at room temperature (25° C.) over night.

The next morning, the cellulose derivative had formed a stiff gel of gray-green color having a faint odor of phenylisocyanate. The gel was comminuted and washed with acetone in 8 portions, using about 500 ml. of acetone in a Waring blender for each portion. Thus, an aqueous-acetone solvent was used both to dehydrate the gel and to dissolve the by-products of xanthation and reaction by-products of the gel during comminution. A very light grey-green colored comminuted gel of about one-half the original volume, i.e. about 900 ml., was obtained This was filtered, pressed and gave a 400 ml. volume of gel after two more liters of washing on the filter with acetone. The product was dried under vacuum at 40–45° C. which yielded 332.1 g. of light-green dry product.

When the phenylisocyanate-xanthate derivative was originally prepared it was hoped that the xanthate group might be unblocked by heating to permit further use of the celulose xanthate. Experiments were carried out in which the xanthate-isocyanate product was heated for several hours at 150° C. It appears from Kjeldahl analysis, nitrogen is retained in the product and the free isocyanate is not appreciably evolved. Thus, while the xanthate may be unblocked from the isocyanate by heating, the isocyanate reacts rapidly enough further so that it is not lost from the cellulose xanthate solid.

Example 47

A solution was prepared by dissolving 23 g. cellulose xanthate powder in 700 ml. distilled water in a Waring blender. The cellulose xanthate powder was obtained by passing dilute viscose through a cation exchange column in the acid form to reduce the pH to about 6.5 and then spray dried to yield a powder having low thiocarbonate and sulfide by-products. The solution prepared in the Waring blender was green-grey in color.

A commercial mixture of 65% 2,4 tolylene disocyanate and 35% 2,6 tolylene disocyanate was used as the electrophilic reagent. 5 ml. of the disocyanate (Nacconate 65) was dispersed at 25° C. into the decausticized cellulose xanthate solution in admixture with 50 ml. of acetone. The acetone solution of tolylene disocyanate was slowly added to the cellulose xanthate solution in the Waring blender at top speed. A grey-white gel formed almost at once. The solution was let stand at 31° C. The gel was placed in the refrigerator.

The gel obtained in this reaction is carbamyl anhydride of the xanthate similar to that produced in Examples 43–46, but having xanthate groups reacted with each of the isocyanate groups.

Example 48

An aqueous solution of pH 7 cellulose xanthate is mixed with a stoichiometric amount of diphenyl methane disocyanate in a Waring blender. The cellulose xanthate is present in the form of an aqueous solution while the diisocyanate is added in solution in an inert immiscible solvent such as toluene. After a short period of mixing a gel is formed which is cellulose xanthate-isocyanate derivative produced by nucleophilic displacement and addition reaction.

Example 49

A solution was prepared by dissolving 20 g. decausticized cellulose xanthate powder in 800 ml. water in a Waring blender. The cellulose xanthate powder had been prepared by passing a viscose solution successively through an anion exchange column in the hydroxyl form and a cation exchange column in the hydrogen ion form to remove both free sodium ions and by-product anions such as the trithiocarbonate and sulfides.

Next, 6 ml. of butyl isocyanate was added by pipette to the top of the stirred solution in the Waring blender at top speed. A grey gel appeared at once even before all of the isocyanate was added at 22° C. Thus, the aliphatic isocyanate reacts almost instanteously with the xanthate group. This was surprising in that while the xanthate group is a strong nucleophile, the aliphatic isocyanate in its reactions with water or amines is normally less reactive than an aromatic isocyanate.

The cellulose xanthate-butyl isocyanate derivative is water soluble and is readily regenerated to cellulose upon heating. It is thus possible to use the butyl isocyanate derivative in applications where regenerated cellulose is to be applied from aqueous solution. Thus, aqueous solutions of the derivative may be applied to paper or fabrics and cellulose regenerated thereon by heating for improving wet and dry strength in paper and for sizing fabrics.

Example 50

A solution was prepared by dissolving 20 g. decausticized cellulose xanthate powder in 700 ml. water in a Waring blender. The cellulose xanthate powder had been prepared by passing dilute viscose through a cation exchange column in the hydrogen ion form and then spray drying the solution.

Next, 50 ml. commercial grade stearyl isocyanate was added slowly to the decausticized xanthate solution in the Waring blender with slow stirring. A yellow dispersion arose after about 30 minutes. The slurry was then stirred while 50 ml. of 0.5 N HCl, was slowly added over a 25 minute period. The initial 10.5 pH decreased to 8.5. The addition of HCl shifts the equilibrium for formation of the derivative. Since the reaction of the stearyl isocyanate with the xanthate group of cellulose should produce hydroxyl ion, the addition of HCl to consume the hydroxyl ion produced in the reaction tends to shift the equilibrium toward the formation of the derivative.

Example 51

In previous examples various isocyanates were reacted with decausticized xanthate solutions. An alternate method for carrying out the reaction is to react in a slightly swollen suspension some of the decausticized cellulose xanthate powder. The fact that the cellulose xanthate powder is in the form of very small hollow spheres provides a high surface area to weight ratio which facilitates completion of reaction.

A cellulose xanthate powder which had been prepared by spray drying a cation (hydrogen ion form) exchanged dilute viscose was used in this process. The cellulose xanthate powder was of low D.S. but was highly pure, since it had been subjected both to anion exchange and cation exchange prior to spray drying.

The cellulose xanthate powder, 320 g., was suspended in 5 liters of acetone in a polyethylene bucket and mixed at high speed with a Heller mixer and 15 g. of butyl isocyanate was dissolved in 400 ml. of acetone and added slowly over a 5 minute period to the rapidly stirred suspension. The suspension was stirred at 25° C. for 10 more minutes, then 100 ml. of water was slowly added to swell the purified low D.S. cellulose xanthate hollow spheres well and stirring continued for 1 hour.

The suspension was filtered off on paper and the filter cake washed with 1 liter of acetone to remove the butyl urea and other impurities or side reaction products. The wet 420 g. product was placed in a large beaker in a refrigerator overnight. A small portion (about 0.3 g.) was easily dissolved in water to give a viscous solution. The butyl isocyanate-cellulose xanthate derivative may be applied to paper or fabrics in the same manner as cellulose xanthate, i.e. in aqueous solution, and regenerated thermally.

Example 52

A dried Erlenmeyer flask is charged with 100 g. carbontetrachloride at 25° C. Next, 5 ml. of phenylisocyanate is dissolved in the carbontetrachloride and 8 drops of Triton X–100 added thereto. A 200 g. portion of 0.5% amylose content, amylose xanthate solution is added to a Waring blender and set at slow speed. The amylose xanthate solution is decausticized by passing it through a cation exchange column in the hydrogen ion form as described above until sufficient alkali is removed to reduce the pH to 8. At pH 8 substantially all free alkali is removed from the solution, the mildly alkaline pH being due to alkali released by partial hydrolysis of the amylose.

The carbontetrachloride solution of phenylisocyanate is added to the Waring blender over a period of about 1 minute. The emulsion is stirred 1 minute and acetic acid is added to adjust the pH to 4.5. The blending operation is continued for 10 minutes longer as the solution rises to 22° C.

The blender contents are then poured into a beaker and allowed to stand at 25° C. for about 72 hours. A white gel is recovered from the surface of the aqueous layer which consists of an amylose derivative, viz., the phenyl carbamyl anhydride of amylose xanthate. The derivative obtained is produced by nucleophilic attack by the xanthate group on the carbon atom in the isocyanate group.

Example 53

A solution was prepared by dissolving 23 g. polyvinyl alcohol xanthate powder in 700 ml. distilled water in a Waring blender. The polyvinyl alcohol xanthate powder was obtained by passing dilute alkaline solution of polyvinyl alcohol xanthate through a cation exchange column in the acid form to reduce the pH to about 6.5 and then spray dried to yield a powder having low thiocarbonate and sulfide by-products. The solution prepared in the Waring blender was green-grey in color.

A commercial mixture of 65% 2,4 tolylene disocyanate and 35% 2,6 tolylene disocyanate was used as the electrophilic reagent. 5 ml. of the disocyanate (Nacconate 65) was dispersed at 25° C. into the decausticized polyvinyl alcohol xanthate solution in admixture with 50 ml. of acetone. The acetone solution of tolylene disocyanate was slowly added to the polyvinyl alcohol xanthate solution in the Waring blender at top speed. A grey-white gel formed almost at once. The solution was let stand at 31° C. The gel was placed in the refrigerator.

The gel obtained in this reaction is carbamyl anhydride of the xanthate similar to that produced in Examples 43–36, but having xanthate groups reacted with each of the isocyanate groups.

Example 54

A solution was prepared by dissolving 20 g. decausticized polyallyl alcohol xanthate powder in 800 ml. water in a Waring blender. The polyallyl acohol xanthate powder had been prepared by passing an alkaline solution of polyallyl alcohol xanthate solution successively through an anion exchange column in the hydroxyl form and a cation exchange column in the hydrogen ion form to remove both free sodium ions and by-product anions such as the trithiocarbonate and sulfides.

Next, 6 ml. of butyl isocyanate was added by pipette to top of the stirred solution in the Waring blender at top speed. A grey gel appeared at once even before all of the isocyanate was added at 22° C. Thus, the aliphatic isocyanate reacts almost instantaneously with the xanthate group. This was surprising in that while the xanthate group is a strong nucleophile, the aliphatic isocyanate in its reactions with water or amines is normally less reactive than an aromatic isocyanate.

The cellulose xanthate-butyl isocyanate derivative is water soluble and is readily regenerated to polyallyl alcohol upon heating. It is thus possible to use the butyl isocyanate derivative in applications where regenerated polyallyl alcohol is to be applied from aqueous solution. Thus, aqueous solutions of the derivative may be applied to paper or fabrics and polyallyl alcohol regenerated thereon by heating for improving wet and dry strength in paper and for sizing fabrics.

POLYMERIC ALCOHOL XANTHATE-CYANAMIDE DERIVATIVES

Example 55

100 g. of technical grade calcium cyanamide was shaken in 500 ml. water for 1 hour at 25° C. and then filtered. The clear, colorless filtrate was divided into 2 portions of about 60% and 40% of the initial volume. The larger portion was passed through an Amberlite IRC 50 resin column in the mixed sodium and acid form to give an effluent pH of 4.8. The column was washed. The second portion of solution was reserved without treatment. A 1% cellulose content viscose was passed through an Amberlite IRC 50H column to yield a pH 8 decausticized viscose solution. 300 ml. of the neutralized or decausticized viscose was added to 200 ml. of the ion exchanged cyanamide solution. A clear solution of pH 8.1 resulted. The solution was adjusted to pH 9.4 using 22% caustic. The solution rapidly turned a light green color over a 5 minute period. It was left at 25° C. for 5 hours and then placed in a refrigerator overnight.

In the second experiment, about 300 ml. of the calcium cyanamide solution was mixed with 500 ml. of the decausticized viscose. A turbid solution of a light green color developed. The solution was left at 25° C. for 5 hours, then placed in a refrigerator overnight. The solution had a pH of 10.4. In each of the experiments the product obtained is a simple carbamyl anhydride of cellulose xanthate.

Example 56

A decausticized aqueous solution of polyvinyl alcohol xanthate (pH 8) is mixed with an aqueous solution of calcium cyanamide. A gel is formed which is the carbamyl anhydride of the xanthate.

Example 57

10 g. of Crofton TB 3 wood pulp was wet out and broken into 500 ml. distilled water in a Waring blender. The resulting slurry was mixed for 5 minutes at high speed, diluted to 1,000 ml. and divided into four 250 ml. portions. An estimate of gelled cellulose volume under constant conditions of precipitation was obtained by adding 15 ml. of the cellulose xanthate-cyanamide derivative (0.6% concentration) to 250 ml. of water, then 10 ml. of 5 N HCl was added with stirring, and a gelatinous precipitate formed. 15 ml. of the xanthate-cyanamide derivative solution was added to the 250 ml. of 1% wood pulp slurry in a Heller mixer for 2 minutes. The pH was lowered to 4.1 with HCl and the mixture immediately filtered. When an excess of HCl, 10 ml. of 5 N, was added to the filtrate a cellulose precipitate formed, whose volume was about ⅙ that of the control. Thus, the cellulose xanthate-cyanamide derivative had exhausted onto the wood fibers at pH 4.1 in a short exhaustion time about 3.6% cellulose on the wood fiber was added from the cellulose xanthate-cyanamide solution.

XANTHATE-IMINE REACTIONS

A series of experiments were carried out demonstrating the synthesis of aminoethyl S-xanthate derivatives of polymeric xanthates. These reactions utilized the nucleophilic addition of a decausticized polymeric alcohol xanthate to a cyclic imine, such as ethylene imine.

Example 58

200 g. of a fresh 7.7% cellulose content blender viscose, having a xanthate sulfur content of about 20–21% based on cellulose, was diluted to 1% cellulose content. The dilute solution was passed through a column of Dowex 50 WX 8H (cation exchange resin, acid form) resin for about 6 minutes. A slightly turbid, green-tan solution was obtained having a pH of 5.8. This solution consisted of essentially pure sodium cellulose xanthate and was essentially free of by-product sulfides and thiocarbonates.

350 ml. of the pH 5.8 decausticized cellulose xanthate solution was slowly poured, with mechanical stirring, into 160 ml. of a mixture of 150 ml. of water and 10 ml. of ethylene imine. The mixture was initially turbid but became clear and had a light green color. The solution was covered and placed at 25° C. for storage and observation. The aminoethyl S-xanthate derivative did not gel until after about 24 hours storage at room temperature. The aminoethyl S-xanthate derivative is cationic and exhausts more readily onto a cellulose fiber surface, e.g. during paper manufacture, than does viscose or a decausticized cellulose xanthate solution.

Example 59

A blender viscose was diluted to 1% cellulose content and neutralized or decausticized to pH 6 by passing through a cation exchange column in the acid form. The resulting, decausticized xanthate solution was spray dried to produce a cellulose xanthate powder having 9.1% xanthate sulfur, based on the cellulose, and which was essentially free of thiocarbonate and sulfide impurities.

160.6 g. of the cellulose xanthate powder was dispersed into 1500 ml. of acetone. About 10 g. of water was added to the slurry to swell the hollow spherical cellulose xanthate particles and aid in the diffusion of the imine for reaction therewith. Then, 6.5 g. of ethylene imine was added in solution in 200 ml. of additional acetone and the slurry stirred for 20 minutes.

Then, to shift the reaction equilibrium after admixture, glacial acetic acid was added slowly drop-wise until 1 ml. of dispersion in 30 ml. of water gave a pH of 8.1. The suspension was stirred another 10 minutes and washed by decantation and resuspension in acetone. The product was dried 1 hour and placed in a refrigerator for storage. A very light green-yellow product was obtained, which was dispersible as a turbid solution in water. Analysis of the product showed that there was essentially no loss of xanthate sulfur in preparing the aminoethyl derivative.

The aminoethyl-xanthate derivative was used in experiments wherein the character of the derivative was evaluated by the strength given to paper hand sheets made with it. A drop box was used to make 4 g. hand sheets with the aminoethyl-xanthate derivative used at loadings from 1–5% based on the weight of the sheet. Over a range of pH it was found that the maximum strength was gotten at about pH 4. Very little turbidity was seen in the filtrate from the hand sheet when the filtrate was strongly acidified with hydrochloric acid. It was concluded that the exhaustion of the aminoethyl-xanthate derivative was somewhat better than the exhaustion of decausticized cellulose xanthate onto paper hand sheets under the same conditions.

Example 60

545 g. of decausticized cellulose xanthate powder was used in the synthesis of aminoethyl-xanthate derivatives. The powder had a 15% xanthate sulfur content and a cellulose D.P. of about 500, and was prepared by cation exchange with an exchange column in the acid form, followed by spray drying. The powder was substantially free of sulfide and thiocarbonate by-products. The powder was slurried for 5 minutes in 6 liters of acetone and then about 7 mole percent of ethylene imine added in the form of a solution in 100 ml. of water. The slurry was mixed for 5 minutes at 10° C. and then glacial acetic acid was added dropwise. 26 ml. of the glacial acetic acid reduced the pH to 8.2 when 1 ml. of the slurry was taken and dissolved in 40 ml. of water. The powder was filtered from the slurry and dried with acetone on the filter by washing with 6 liters of dry acetone. The acetone-wet powder was evacuated 1 hour in a vacuum desiccator and placed in a refrigerator.

The aminoethyl-xanthate derivative was used as an additive in the prepaartion of paper and regenerated thermally during the drying of the paper web. The paper produced had substantially improved wet and dry strength compared to controls.

Example 61

A solution of polyvinyl alcohol xanthate is prepared as described above and decausticized by passing through a cation exchange resin in the acid form. The solution is reduced to pH 6.5 and then spray dried to produce a water soluble powder.

About 500 g. of the polyvinyl alcohol xanthate powder is slurried in 6 liters of acetone and then mixed with about 1 mole and then mixed with about 7 mole percent ethylene imine dissolved in 100 ml. of water. The slurry is mixed for 5 minutes at 10° C. and glacial acetic acid added dropwise to shift the equilibrium of the reaction in the direction of forming the aminoethyl derivative. The slurry is then filtered and washed with acetone and dried in a vacuum desiccator. The aminoethyl-xanthate derivative is useful as a wet and dry strength additive for paper.

PREPARATION OF HYDROXYALKYL AND HYDROXYARYL XANTHATE ESTERS

A series of experiments were carried out in which various esters of polymeric alcohol xanthates were prepared by nucleo-philic displacement and addition reaction of decausticized polymeric alcohol xanthates with various aldehydes.

Example 62

A spin viscose solution was diluted to 1.5% cellulose content and decausticized to pH 7.4 with Dowex 40 WX 8H exchange resin (acid form). A control sample was retained for observation. 400 ml. of the pH 7.4 solution was stirred and 50 ml. of 36% ACS Reagent formaldehyde solution, with 12% methanol, was added over a 1 minute period. At this point, pH is equal to 10.1 at 27° C. The pH had risen over a period of about 1 minute and probably resulted from the reaction since the normal aging of a 1% decausticized solution does not raise the pH this fast. The solution to which the formaldehyde had been added changed to a greenish-tan color from its normal brown-fawn color.

The solution which was produced by reaction by formaldehyde with decausticized cellulose xanthate consisted of an almost quantitative yield of the methylol ester of cellulose xanthate. A portion of the solution was adjusted to pH 5.4 by further treatment with a cation exchange resin in the acid form. A colorless clear solution was obtained. A similar concentration of the decausticized sodium cellulose xanthate solution was also brought down to pH 5.4 by cation exchange. The methylol xanthate solution remained stable while the pH 5.4 cellulose xanthate solution gelled within a few minutes.

The methylol ester of cellulose xanthate is water soluble and is useful as a wet and dry strength additive to paper and for sizing fabrics. The solution may be applied to paper hand sheets or paper webs or to fabrics and regenerated either thermally or by treatment with acid.

Example 63

In this experiment a methylol ester of cellulose xanthate was prepared in solution and spray dried.

A blender viscose was diluted to 2% cellulose content and passed through a cation exchange column (Dowex WX 8H, acid form) to remove caustic and some of the xanthation by-products. 320 pounds of the diluted viscose was used in preparing the decausticized xanthate solution for reaction. Next, ACS grade 36–40% formaldehyde Formalin solution was added slowly to the pH 7.2 decausticized cellulose xanthate solution at 18° C. After 15 minutes, 790 g. of the Formalin solution had been added along with a small amount of Dowex 50 WX 8H resin to hold the pH of the solution at about 7. The pH tends to rise because of the reaction of the formaldehyde with the xanthate, that is, cellulose xanthate ion plus formaldehyde yields an intermediate product which hydrolyzes to give the methylol xanthate ester and free sodium hydroxide. The methylol xanthate ester is, however, in equilibrium with the free formaldehyde and a quantitative conversion is not realized unless a large excess of formaldehyde is used or the by-product sodium hydroxide removed. The addition of the exchange resin in the acid form removes the by-product sodium hydroxide and allows the reaction to go essentially to completion.

The methylol xanthate solution produced in the above experiment was filtered to remove the ion exchange resin used in causing the reaction to go to completion. The filtered solution was then fed into a spray dryer and a powder obtained consisting of essentially pure methylol ester of cellulose xanthate. The powder was redissolved readily in water and is useful in treating paper for improved wet and dry strength or for sizing or for other treatments of fabrics, both by thermal regeneration and by treatment with acid.

Example 64

In another experiment, the methylol ester of cellulose xanthate was prepared by direct reaction with decausticized cellulose xanthate powder. This reaction has the advantage that it occurs at a much higher concentration of reactants than in dilute decausticized viscose solution and, furthermore, since the powder has most of the sulfide and thiocarbonate by-products evolved during spray drying, the reaction occurs in the virtual absence of these by-products which can also react with the formaldehyde.

101.4 g. of decausticized cellulose xanthate powder (prepared by passing dilute viscose through a cation exchange column in the acid form and spray drying the resulting solution) was placed in a 500 ml. wide mouth Erlenmeyer flask and 180 g. of acetone added. A Heller mixer was used to stir the dispersion while 54.2 g. of an ACS 30% formaldehyde solution was added. The pH of the mixture is 9.5, measured by taking a milliliter of the slurry from a container and rapidly dissolving in 40 g. water and then measuring pH. After about 30 minutes mixing, 3 ml. of glacial acetic acid was added drop-wise to bring the pH to 8, when more formaldehyde can rapidly react with the powder. The dispersion was stirred at 25° C. for 30 minutes more and filtered. After acetone washing, a light yellow powder was obtained which was similar in appearance to the spray-dried methylol xanthate produced in Example 63.

After 2 hours in vacuum oven at 30° C., the powder weighed 118.5 g. and thus contained some residual solvent. The powder was left in the oven at room temperature overnight to remove traces of residual solvent. The powder produced in this reaction is the methylol ester of cellulose xanthate and is soluble in water for use as a fabric size or for treating paper for wet and dry strength improvement.

Example 65

In another experiment, solid paraformaldehyde was used as the source of formaldehyde for reaction with decausticized cellulose xanthate.

87 g. solid paraformaldehyde was added in a 500 ml. flask and 350 ml. hot water added and refluxed for 2 hours. The treatment was effective to depolymerize the paraformaldehyde. A second synthesis of formaldehyde was made by dispersing 55 g. of paraformaldehyde in 300 ml. of water with 0.2 ml. of concentrated HCl added as depolymerization catalyst. The first solution was diluted to a 15% formaldehyde content and the second solution diluted to a 10% formaldehyde content for further use and stored in a refrigerator.

113.4 g. of solid decausticized cellulose xanthate (produced by cation exchange treatment of dilute viscose and spray drying the same) was placed in a 500 ml. wide mouth Erlenmeyer flask together with 250 ml. of acetone. The cellulose xanthate powder contained 15.4% xanthate sulfur based on cellulose. 51 g. of the 15% formaldehyde solution was added with stirring and stirred rapidly for 5 minutes. Then, 10% acetic acid in acetone was slowly added, in separate portions over a 15 minute period, to displace the formation equilibrium by reacting with the sodium hydroxide released in the reaction of the xanthate anion with the carbonyl group of the formaldehyde. The acetic acid was also used to reduce the pH of the initial suspension which was about 10.5. The pH of the slurry was measured by dissolving 1 ml. of the slurry in 15 ml. of water and measuring pH. The solution was at pH of about 8.5.

The acetone-cellulose xanthate powder-formaldehyde dispersion became greyish-yellow in color at the end of the reaction. About 50% more excess of formaldehyde in relation to xanthate was used in the reaction. The powder was filtered from the slurry and washed with 1.5 liters of dry acetone to remove the water and some of the by-products. The powder was sucked dry on a vacuum filter and then placed in a vacuum oven at 30° C. overnight. At 3 hours' drying time, only about 4 g. of retained acetone was left. The product produced in this reaction was a methylol ester of cellulose xanthate and is soluble in water and useful as a treating agent for paper and fabrics.

In a second experiment, 100 g. of decausticized cellulose xanthate powder, having a 9% xanthate sulfur content, was dispersed into 1.5 liters of acetone in a 2 liter beaker. 60 g. of 10% concentration acid depolymerized formaldehyde solution was added with stirring. The formaldehyde was added in a ratio of about 2 moles per mole of xanthate in the powder. Stirring was continued for 10 minutes at which time 1 ml. of the slurry added to 30 ml. of water had a pH of 8.1.

The powder was filtered off, resuspended in 1.5 liters dry acetone to remove water and then stirred 5 minutes, then filtered and washed with 1 liter additional acetone on the filter. At this point, the powder weighed 127 g. and was dried down to the initial weight under vacuum at 25° C. The product obtained had a 6.4% xanthate sulfur content and consisted of a methylol ester of cellulose xanthate as in the other experiments.

Example 66

A spin amylose xanthate solution was diluted to 1.5% amylose content and decausticized to pH 7.4 with Dowex 40 WX 8H exchange resin (acid form). A control sample was retained for observation. 400 ml. of the pH 7.4 solution was stirred and 50 ml. of 36% ACS reagent formaldehyde solution, with 12% methanol, was added over a 1 minute period. At this point, pH is equal to 10.1 at 27° C. The pH had risen over a period of about 1 minute and probably resulted from the reaction since the normal aging of a 1% decausticized solution does not raise the pH this fast. The solution to which the formaldehyde had been added changed to a greenish-tan color from its normal brown-fawn color.

The solution which was produced by reaction by formaldehyde with decausticized amylose xanthate consisted of an almost quantitative yield of the methylol ester of amylose xanthate. A portion of the solution was adjusted to pH 5.4 by further treatment with a cation exchange resin in the acid form. A colorless clear solution was obtained. A similar concentration of the decausticized sodium amylose xanthate solution was also brought down to pH 5.4 by cation exchange. The methylol xanthate solution remained stable while the pH 5.4 amylose xanthate solution gelled within a few minutes.

The methylol ester of amylose xanthate is water soluble and is useful as a wet and dry strength additive to paper and for sizing fabrics. The solution may be applied to paper hand sheets or paper webs or to fabrics and regenerated either thermally or by treatment with acid.

Example 67

A spin polyvinyl alcohol solution was diluted to 1.5% polyvinyl alcohol content and decausticized to pH 7.4 with Dowex 40 WX 8H exchange resin (acid form). A control sample was retained for observation. 400 ml. of the pH 7.4 solution was stirred and 50 ml. of 36% ACS reagent formaldehyde solution, with 12% methanol, was added over a 1 minute period. At this point, pH is equal to 10.1 at 27° C. The pH had risen over a period of about 1 minute and probably resulted from the reaction since the normal aging of a 1% decausticized solution does not raise the pH this fast. The solution to which the formaldehyde had been added changed to a greenish-tan color from its normal brown-fawn color.

The solution which was produced by reaction by formaldehyde with decausticized polyvinyl alcohol xanthate consisted of an almost quantitative yield of the methylol ester of polyvinyl alcohol xanthate. A portion of the solution was adjusted to pH 5.4 by further treatment with a cation exchange resin in the acid form. A colorless clear solution was obtained. A similar concentration of the decausticized sodium polyvinyl alcohol xanthate solution was also brought down to pH 5.4 by cation exchange. The methylol xanthate solution remained stable while the pH 5.4 polyvinyl alcohol xanthate solution gelled within a few minutes.

The methylol ester of polyvinyl alcohol xanthate is water soluble and is useful as a wet and dry strength additive to paper and for sizing fabrics. The solution may be applied to paper hand sheets or paper webs or to fabrics and regenerated either thermally or by treatment with acid.

Example 68

In this example, an aromatic aldehyde, viz, benzaldehyde, was reacted with decausticized cellulose xanthate to produce an ester derivative.

Viscose was treated with a cation exchange resin in the acid form and spray dried to produce a water soluble cellulose xanthate powder substantially free of thiocarbonate and sulfide by-products. The powder was redissolved in water to produce a solution of 3% concentration having a pH of about 10. The solution was treated further with Dowex 50 WX 8H resin to bring the pH of the solution down to about 7.6. The solution was then filtered in preparation for reaction with the aldehyde.

A 200 g. portion of the filtered solution was mixed with 1 ml. of benzaldehyde in a Waring blender. The pH went to 8.1 in a few minutes and a color change took place. Then more Dowex 50 WX 8H resin was added slowly with stirring and a pH measurement taken. At the end of the reaction the solution had a pH of 5.1 and was a grey-white turbid dispersion, smelling of benzaldehyde. The solution remained pourable at this low pH for at least 3 hours, when the beakers were placed in a refrigerator. The same 3% solution of decausticized cellulose xanthate at pH 5.1 would gel within a few minutes at room temperature.

The product of this reaction is an ester of cellulose xanthate which results from nucleophilic reaction of the xanthate with the benzaldehyde. The product is water soluble and may be applied to or made in situ or textiles to provide ultraviolet barrier properties.

Example 69

In this example, a decausticized solution of cellulose xanthate was reacted with vanillin.

About 150 g. of the pH 7.8, 3% cellulose xanthate solution, used in Example 68, was mixed with 1.7 g. vanillin with stirring. The pH of the solution became 5.8 and the solution acquired a blue-grey color and increased in viscosity. Ten minutes later the pH of the solution was 6.5.

The product of this reaction is a cellulose xanthate ester which is dispersible in water and may be applied to or made in situ on textiles to provide ultraviolet barrier properties.

Example 70

In this example decausticized cellulose xanthate was reacted with glycidealdehyde.

16 g. of decausticized cellulose xanthate powder (produced by spray drying cation exchanged diluted viscose) was dissolved in 350 ml. of water and reacted with glycidealdehyde in a blender. The solution changed in color over a 30 minute period to an orange-fawn color. After 2½ hours at 25° C. the product had set into a soft gel with a cellulose content of about 2%. When the product was diluted to 1% concentration with water the derivative redissolved. The product produced is a substituted ester of cellulose xanthate obtained by nucleophilic reaction as in the other reactions with aldehydes.

Example 71

In this example decausticized cellulose xanthate was reacted with acetaldehyde to produce an alkylol ester of the xanthate.

20 g. of 375 D.P., 20% xanthate sulfur content, decausticized cellulose xanthate powder (prepared as in Example 70) was slurried into a mixture of 200 ml. of water and 300 g. of finely chopped ice. A large excess, 10 g., of acetaldehyde was added to the 0° C. solution and Dowex 50 WX 8H was added to bring the pH to 6. The slurry was allowed to react with occasional mixing. Additional Dowex resin was added to bring the pH back to pH 8 after it had risen by release of sodium hydroxide during the reaction.

After 1 hour reaction, all the ice had melted and a brown-red solution was obtained. A part of the solution was reduced to pH 2.5 and let stand for 30 minutes. Then the pH was brought back up to pH 6.5. No precipitate was obtained under these conditions. The product obtained is the hydroxyalkyl ester of cellulose xanthate produced by nucleophilic addition and substitution reaction of the xanthate with the aldehyde.

NUCLEOPHILIC ADDITION ACROSS A DOUBLE BOND

Several experiments were carried out in which decausticized xanthates were reacted by nucleophilic addition across a double bond. Decausticized xanthates were reacted with maleic anhydride or maleic acid as in the following examples.

Example 72

60 g. of 375 D.P., 15% xanthate sulfur content, decausticized cellulose xanthate powder was dissolved in 1940 ml. of water in a Waring blender over a 20 minute period. Approximately 80 millimoles of xanthate was present in the 60 g. of powder. The solution obtained was neutralized to pH 7 using Dowex 50 WX 8H in the acid form. The suspension of resin beads in the solution was slowly filtered and the solution used in reaction with maleic anhydride.

Over a period of 10 minutes, at room temperature, a 1 molar, pH 1.8, freshly made maleic anhydride solution was added to the decausticized cellulose xanthate solution. The solution became beige colored and began to gel and turn grey-beige in color. After stirring the jelly for 20 minutes at pH 2, at 25° C., a portion of the jelly was hydrolyzed with sodium hydroxide to open the anhydride. After about 40 ml. of a 50% sodium hydroxide solution had been added the gel was redissolved. At this point, the total volume of the solution was about 2½ liters. The derivative produced in this reaction is a xanthate ester produced by 1,4 addition across the maleic anhydride.

Example 73

20 g. decausticized cellulose xanthate was dissolved in 500 ml. of water, and 31 ml. of 1 molar maleic acid was added and mixed with a Heller mixer to give a solution of pH 6.4. The solution was yellow-green and viscous. The product obtained in this reaction is an ester produced by nucleophilic attack of the xanthate on the double bond in the maleic acid.

PREPARATION OF ESTERS

A series of experiments were carried out in which simple esters of xanthates were prepared by reaction of alkyl halides and decausticized polymeric alcohol xanthates.

Example 74

30 g. of 10% xanthate content, decausticized cellulose xanthate powder (purified by a combined anion exchange and cation exchange treatment prior to spray drying) was dissolved in 850 ml. of water to produce a viscous, dark tan-grey solution. 5 ml. of methyl iodide, which represents a substantial excess over the known xanthate content equivalent, was added drop by drop by pipette into the stirred solution in a Waring blender. After about 3 drops were added, an immediate collor change took place to give a grey-green color, and after about 10 drops, gelation started and continued during the remainder of the addition of 5 ml. of methyl iodide.

The gel was washed by stirring in water and filtered to get a slightly yellow filtrate. Acidification of a portion of the filtrate did not give a precipitate so that even low molecular weight tailings from the xanthate are absent in the filtrate. The total reaction time was about 15 minutes at 35° C. Although the total mixing time was 15 minutes, the reaction appears to have occurred in the first 3 seconds. The grey-white gel was produced in a partitioned dish and allowed to dry overnight at room temperature. The gel is soluble in aqueous caustic and the solution was stable for several months as a clear 1% solution. The product obtained in this experiment was S-methyl derivative of cellulose xanthate.

Example 75

A 9% starch concentration solution was prepared of D.S. 0.216 starch xanthate and neutralized to pH 8.5 using a cation exchange resin in the hydrogen ion form. 160 g. of the solution was diluted to 4 liters in preparation for the synthesis of a methyl derivative.

At high speed, in a Heller mixer, 31.7 g. of methyl iodide was added into the solution and also at once a white dispersion formed which then formed a soft gel in about 6 to 7 minutes at 25° C. After collection on muslin, the gel syneresed to about 200 ml. and was subsequently washed in a Waring blender in 400 ml. of water, and finally dried in methanol. The derivative had a grey-green color when dried. After further washing and drying a white S-methyl starch xanthate gel was obtained which was almost odor free after drying at 60° C. under vacuum.

NUCLEOPHILIC REACTION OF DECAUSTICIZED XANTHATES WITH ACYL HALIDES, HALOGENATED ACIDS, AND SALTS AND ESTERS THEREOF

A series of experiments were carried out in which various acyl halides, and various halogenated acids and salts and esters thereof were reacted decausticzed xanthates to product various derivatives by nucleophilic addition and substitution.

Example 76

An interfacial reaction was carried out between an aqueous solution of decausticized cellulose xanthate and adipoyl chloride dissolved in carbontetrachloride.

200 g. of pH 7.2 decausticized cellulose xanthate solution (prepared by passing dilute viscose through a cation exchange column in the acid form) was mixed with a 1% solution of adipoyl chloride and 3 drops of Triton X-100 dissolved in carbontetrachloride. A reaction took plate at the interface with formation of a gel. The aqueous phase went to pH 1.4 as a result of the libration of acid in the reaction. To avoid rapid cellulose degradation, the pH was adjusted to pH 4 by addition of 0.5 N aqueous caustic. The product obtained was an emulsion of the gel in the aqueous phase. The product was a difunctional acid anhydride produced by nucleophilic reaction of the xanthate with the acyl halide group.

Example 77

An interfacial reaction is carried out between an aqueous solution of decausticized amylose xanthate and adipoyl chloride dissolved in carbontetrachloride.

200 g. of pH 7.2 decausticized amylose xanthate solution (prepared by passing dilute amylose xanthate through a cation exchange column in the acid form) is mixed with a 1% solution of adipoyl chloride and 3 drops of Triton X-100 dissolved in carbontetrachloride. A reaction takes place at the interface with formation of a gel. The aqueous phase goes to pH 1.4 as a result of the libration of acid in the reaction. To avoid rapid cellulose degradation, the pH is adjusted to pH 4 by addition of 0.5 N aqueous caustic. The product obtained is an emulsion of the gel in the aqueous phase. The product is a difunctional acid anhydride produced by nucleophilic reaction of the xanthate with the acyl halide group.

Example 78

When hexamethylenediamine and decausticized cellulose xanthate solution are mixed and contacted with a carbontetrachloride solution of adipolyl chloride, a mixture of a nylon type polymer and a nylon-cellulose graft polymer is formed in dispersion. Fibers which are formed of this composition are more hygroscopic and have a wider dyeing range.

Example 79

13.3 g. of 12% xanthate sulfur content decausticized celluose xanthate powder (produced by subjecting dilute viscose to cation exchange with a resin in the acid form and then spray drying the decausticized product) was dissolved in a Waring blender and 500 ml. of water. About 17 millimoles of xanthate equivalent is present.

A small excess, that is, 2.54 g., of ethylchloroformate was added slowly, drop-wise, to the decausticized cellulose xanthate solution over a 2 minute period while stirring with the blender. A light, grey-green gel formed rapidly. The gel was comminuted in four portions with 800 ml. of acetone in a Waring blender and dehydrated and then let stand in excess acetone.

The chloride analysis on an aliquot of the filtrate indicated that the reaction was almost quantitative. The product obtained is an ethyl ester derivative of the cellulose xanthate produced by nucleophilic reaction of the xanthate at the carbonyl carbon.

Example 80

In this example, the S-carboxymethyl ester of cellulose xanthate was prepared by reaction of decausticized cellulose xanthate with chloroacetic acid.

15.1 g. of spray dried decausticized cellulose xanthate powder, containing 12% xanthate sulfur, was placed in 600 ml. of water and stirred in a Waring blender. About 30 millimoles of xanthate sulfur was present. An excess, 2.90 g. as compared to a theoretical 1.92 g., of chloroacetic acid was dissolved in 200 ml. of water and this solution added over a 5 minute period to the slurry in the Waring blender.

An almost colorless, turbid, grey-green dispersion resulted after the addition with stirring at 25° C. The mixture was at pH 6 at this point. The solution was aerated with a gas disperser until the air was free of carbon disulfide and hydrogen sulfide. About 20 minutes was required. After 1½ hours' storage at 25° C. the solution gelled. On dilution in a 1:4 ratio, the gel dissolved in water. When a 50 ml. portion was heated to 85° C. over a 15 minute period in a double boiler it did not gel even at pH 9.5. After 40 minutes at 80° C. the solution gelled. The product produced in this reaction is the S-carboxymethyl ester of cellulose xanthate. The product is water soluble and may be regenerated thermally or by acid treatment for use in treating paper or textiles.

Example 81

In this example, the S-carboxymethyl ester of starch xanthate was prepared by reaction of decausticized starch xanthate with chloroacetic acid.

15.1 g. of spray dried decausticized starch xanthate powder, containing 12% xanthate sulfur, was placed in 600 ml. of water and stirred in a Waring blender. About 30 millimoles of xanthate sulfur was present. An excess, 2.90 g. as compared to a theoretical 1.92 g., of chloroacetic acid was dissolved in 200 ml. of water and this solution added over a 5 minute period to the slurry in the Waring blender.

An almost colorless, turbid, grey-green dispersion resulted after the addition with stirring at 25° C. The mixture was at pH 6 at this point. The solution was aerated with a gas disperser until the air was free of carbon disulfide and hydrogen sulfide. About 20 minutes was required. After 1½ hours' storage at 25° C. the solution gelled. On dilution in a 1:4 ratio, the gel dissolved in water. When a 50 ml. portion was heated to 85° C. over a 15 minute period in a double boiler it did not gel even at pH 9.5. After 40 minutes at 80° C. the solution gelled. The product produced in this reaction is the S-carboxymethyl ester of starch xanthate. The product is water soluble and may be regenerated thermally or by acid treatment for use in treating paper or textiles.

Example 82

In this example, the S-carboxymethyl ester of polyvinyl alcohol xanthate was prepared by reaction of decausticized polyvinyl alcohol xanthate with chloroacetic acid.

15.1 g. of spray dried decausticized polyvinyl alcohol xanthate powder, containing 12% xanthate sulfur, was placed in 600 ml. of water and stirred in a Waring blender. About 20 millimoles of xanthate sulfur was present. An excess, 2.90 g. as compared to a theoretical 1.92 g., of chloroacetic acid was dissolved in 200 ml. of water and this solution added over a 5 minute period to the slurry in the Waring blender.

An almost colorless, turbid, grey-green dispersion resulted after the addition with stirring at 25° C. The mixture was at pH 6 at this point. The solution was aerated with a gas disperser until the air was free of carbon disulfide and hydrogen sulfide. About 20 minutes was required. After 1½ hours' storage at 25° C. the solution gelled. On dilution in a 1:4 ratio, the gel dissolved in water. When a 50 ml. portion was heated to 85° C. over a 15 minute period in a double boiler it did not gel even at pH 9.5. After 40 minutes at 80° C. the solution gelled. The product produced in this reaction is the S-carboxymethyl ester of polyvinyl alcohol xanthate. The product is water soluble and may be regenerated thermally or by acid treatment for use in treating paper or textiles.

Example 83

In this example a solution of S-carboxymethyl cellulose xanthate was prepared and spray dried to produce a stable water soluble powder.

24 g. of 375 D.P., 21% xanthate sulfur content, spray dried decausticized cellulose xanthate powder was dissolved into 380 ml. of water. The solution had a concentration of about 4% cellulose. The material was further diluted to about 3% in a one-gallon Waring blender, representing about 750 ml. of solution. The solution was calculated to have about 44 millimoles of xanthate sulfur which would theoretically require about 4.2 g. of chloroacetic acid for reaction therewith.

A slight excess, viz. 5.75 g. of chloroacetic acid was dissolved in water, 200 ml. and dumped into the blender, mixed 1 minute and placed in a 1 liter beaker. The solution resulting was grey-green in color and had a pH of 4.6.

The S-carboxymethyl cellulose xanthate ester was spray dried in the same spray dryer used in preparing the decausticized cellulose xanthate powder. The product is a finely divided powder, grey-green in color, which can be redissolved in water or alkali and which may be regenerated by thermal treatment on by acidification with strong acid.

During the experiments carried out in the preparation of this product it was found that the by-product trithiocarbonate and sulfides in the decausticized viscose can react with chloroacetic acid about as readily as can the xanthate. It was therefore found that the reaction proceeds much more efficiently when the cellulose xanthate is decausticized in a cation exchange column in the acid form to reduce the pH as low as possible without actually precipitating regenerated cellulose. In some experiments the decausticized cellulose xanthate solution was taken to a pH of about 4.8 and then sparged to remove carbondisulfide or hydrogen sulfide which is released under acid conditions. The decausticized cellulose xanthate solution, substantially free of trithiocarbonate and sulfides, is a vastly superior reagent in carrying out nucleophilic reactions with chloroacetic acid.

Example 84

S-carboxymethyl cellulose xanthate ester, prepared as described in Examples 80 and 83 was used in treating consolidated paper board and also a paper off-set board to yield improved grease resistance. The S-carboxymethyl cellulose xanthate ester in a 3% aqueous solution was applied to paper boards at loadings ranging from one-half pound to three pounds addon per 1,000 sq. ft. and regenerated cellulose on the board which gave excellent resistance to grease, Crisco, Mazola oil, and the like.

MISCELLANEOUS REACTIONS OF DECAUTICIZED POLYMERIC ALCOHOL XANTHATES WITH ELECTROPHILIC REAGENTS

Example 85

A blender viscose was diluted to 2% cellulose content and passed through a cation exchange column in the acid form to produce a decausticized solution having a pH of 6. Upon spray drying, the solution was converted to a finely divided dry powder of cellulose xanthate which is essentially free of alkali and from which the trithiocarbonated and sulfide impurities have been removed as a result of heating under conditions of low pH. 20 g. of the decausticized cellulose xanthate powder, 400 D.P., 15% xanthate sulfur content, was dissolved in 700 ml. distilled water to make an approximately 2% cellulose content solution. 30 millimoles of xanthate sulfur is present in the solution.

Next, 3.58 g. (60 millimoles) of propylene oxide was added to the decausticized xanthate solution in a Waring blender at 29° C. The tan color of the solution lightened almost immediately to a light yellow. In 9½ minutes the solution gelled rapidly. The gel was comminuted, washed in three 2-liter washes for 20 minutes each time, then dried in a vacuum at 40° C.

Example 86

In this example a decausticized cellulose xanthate was reacted with sodium dithionite, $Na_2S_2O_4$. 20 g. of 375 D.P. decausticized cellulose xanthate powder, 24.2% xanthate sulfur content, was dissolved in 500 ml. of distilled water in a Waring blender at about 25° C. A dark tan-brown solution was produced containing about 40 millimoles of xanthate sulfur. To this solution there was added 7 g. of sodium dithionite as a solid. The color of the solution began to lighten at once. After 3 minutes' mixing the solution became a pink-orange, having a pH of 9.3. The solution on standing for 2 hours decreased in pH to 7.1 and remained transparent. After about 20 hours of standing at room temperature the solution gelled.

The product obtained in this reaction is a sodium sulfite derivative of the cellulose xanthate.

Example 87

In this example a decausticized cellulose xanthate solution was used in a ring opening reaction with propiolactone.

4 g. of decausticized cellulose xanthate powder, 24% xanthate sulfur content, was dissolved in 200 ml. of water to give a clear, tan solution having a pH of approximately 11. Cold betapropiolactone was dropped by a dropper into the stirred solution. After 10 drops, the color was noted to fade toward yellow. As the reagent was added the pH went down. In 20 minutes, 6 g. of the propiolactone had been added and the pH was 7 at 25° C. Over a period of 2 hours, the pH fell to 4 and the solution began to gel. A small amount of the gel when dissolved in 2% sodium hydroxide gave a color solution. Thus, the gel was not the result of dexanthation but rather the result of the formation of a carboxyethyl ester derivative.

Example 88

In this example a decausticized cellulose xanthate solution was reacted with glycidol.

A decausticized cellulose xanthate powder, 15% xanthate sulfur content 400 D.P., was dissolved in water in a Waring blender to produce a 2% cellulose concentration aqueous solution. Then, 5 moles of cylcidol were dumped into the solution in one step with the blender operating. After 8 minutes, the mixture coagulated.

The gel was an ester produced by nucleophilic reaction of the xanthate group with the glycidol and is insoluble in most solvents. The product is soluble upon high dilution in water or in aqueous alkali.

Example 89

In this example methane sulfonyl chloride was reacted with a decausticized cellulose xanthate to produce a nonionic derivative.

Blender viscose was diluted to about 1% cellulose content and passed through an ion exchange column containing a cation exchange resin in the acid form, to reduce the pH to about 6. The solution was then sparged to remove gaseous by-products, thus eliminating the trithiocarbonate and sulfide impurities.

The decausticized cellulose xanthate solution, essentially free of ionic impurities, was reacted with methane sulfonyl chloride to produce a non-ionic derivative which is highly viscous. The reacton involves the nucleophilic attack on the methane sulfonyl chloride displacing the chlorine and resulting in a sulfonyl-anhydride of cellulose xanthate.

In this procedure, the elimination of the trithiocarbonate and sulfide by-products is almost essential to prevent a substantial loss of the methane sulfonyl chloride reactant.

Example 90

In this example a hydrophobic cellulose xanthate derivative was prepared containing silicon.

16 g. of a decausticized cellulose xanthate powder, 14% xanthate sulfur content, 400 D.P., was dissolved in 500 ml. water in a Waring blender to make a 2% cellulose content solution. This solution contained about 22 millimoles of xanthate sulfur.

An equivalent amount, e.g. 22 millimoles, of trimethylchlorosilane was weighed into a beaker and then introduced into the rapidly stirred solution. The pH of the solution fell within a minute to pH 6.2. The solution began to thicken while the blender operated and in about 11 minutes the mixture gelled.

The product obtained in this reaction is the trimethylsilyl ester of cellulose xanthate.

IN SITU FORMATION OF XANTHATE DERIVATIVES ON SUBSTRATES

A series of experiments were carried out in which the xanthate derivatives were prepared in situ on substrates such as paper, textiles, or other fibrous materials, by nucleophilic substitution and addition reactions.

Example 91

In this example, a nucleophilic substitution and addition reaction of cellulose xanthate was carried out in situ on paper fibers.

A long fiber hemp paper (Dexstar tissue) was saturated with a solution of 0.5% cellulose content decausticized viscose (prepared by cation exchange treatment of dilute viscose). The saturated paper had a 400% loading of the decausticized cellulose xanthate solution. The paper was then immersed in a 1% solution of tolylene diisocyanate-carbontetrachloride (the experiment was also duplicated using a 1% solution of tolylene diisocyanate in acetone). A derivative was formed in situ on the paper fibers which was identical to that obtained in Example 47.

Example 92

In this example methyl cellulose xanthate ester was formed in situ on hemp fiber paper.

A long fiber hemp paper was treated, as described in Example 91, with a dilute decausticized solution of cellulose xanthate to produce a 400% loading of the 0.5% cellulose content solution on the paper fibers. The paper was then immersed in a 5% solution of methyl iodide in carbontetrachloride. The reaction took place rapidly with formation of the methyl ester of cellulose xanthate in situ on the paper fibers.

Example 93

In this example textile fibers were treated to produce an in situ formation of a xanthate derivative.

A cotton fabric was immersed in a 2% cellulose content solution of decausticized cellulose xanthate (decausticized by cation exchange treatment). The fabric contained a 100% loading of the solution. Next, the saturated fabric was immersed in a 5% solution of trimethylchloro silane in carbontetrachloride. A rapid reaction took place producing the trimethyl silyl ester of cellulose xanthate in situ on the fabric.

Example 94

In this example the in situ formation of a xanthate derivative was carried out as a heterogeneous reaction.

A piece of cotton fabric soaked in a 2% solution of decausticized cellulose xanthate, as described in Example 93, was held over a beaker of a trimethylchlorosilane and exposed to the vapors thereof. The beaker was maintained at a temperature of 60° C. to effect a substantial vaporization of the trimethylchloro silane. The reaction took place rapidly with formation of the trimethylchloro silyl ester of cellulose xanthate in situ on the cotton fibers.

In the foregoing experiments, and in other experiments carried out in demonstrating this invention, it has been found that polymeric alcohol xanthates of all kinds undergo nucleophilic displacement and addition reactions with all types of electrophilic reagents when the polymeric alcohol xanthates are used in a decausticized and, in some cases, a deionized state. The decausticized xanthate materials may be used either as solids, preferably in finely divided form, as produced by spray drying a decausticized xanthate solution, or in solution in water or dispersed in non-aqueous solvents. In many cases, particularly where the electrophilic reagents are expensive materials, it is preferred to prepare the decausticized xanthate solutions under conditions which eliminate competing nucleophilic impurities, e.g. trithiocarbonate, sulfides, etc. The impurities, such as the trithiocarbonates and sulfides, are removed very cheaply by neutralizing the xanthate solutions to less than pH 7 and then either sparging to remove the gases which are released or spray drying to produce the purified xanthate powder from which the impurities have been evolved during spray drying. Another inexpensive technique for removing impurities which are competing nucleophiles from polymeric alcohol xanthates is to pass the polymeric alcohol xanthate successively through an anion exchange column in the hydroxyl ion form and then through a cation exchange column in the hydrogen ion form. Many of the reaction products produced in the examples given above are known compounds in the prior art and have been found by me to be useful for many of the purposes for which decausticized cellulose xanthate solutions have been used. In many cases the nucleophilic reaction product is water soluble and may be stored as a solution or may be spray dried to produce a soluble powder which may be stored for further reaction or further use. The process which is described above and illustrated by the various examples is applicable broadly to the reaction of decausticized polymeric alcohol xanthates with any and all electrophilic reagents. The reaction is not peculiar to any particular electrophilic materials and by proper selection of reaction conditions, e.g. use of suitable inert solvents, any nucleophilic derivative of the xanthates may be prepared. As previously noted, the xanthates used are decausticized and preferably treated to remove competing nucleophilic impurities and may be used either in solution or as a dry powder.

I claim:

1. In a method of producing polymeric xanthate derivatives by nucleophilic addition or displacement reaction with a polymeric alcohol xanthate, the improvement which comprises reacting an electrophilic reagent with a polymeric alcohol xanthate decausticized by ion exchange or ion retardation, having a pH less than 13 measured in aqueous solution at 1% concentration, and substantially free of salts produced by neutralization of free caustic in the xanthate.

2. A method in accordance with claim 1 in which the xanthate reactant is cellulose xanthate, amylose xanthate, dextran xanthate, starch xanthate, sugar xanthate, polyvinyl alcohol xanthate, or polyallyl alcohol xanthate.

3. A method in accoradnce with claim 1 in which the xanthate is a solution of a polymeric alcohol xanthate decausticized by treatment with an ion exchange or ion retardation material.

4. A method in accordance with claim 1 in which the xanthate is a powder produced by spray drying a solution of a polymeric alcohol xanthate decausticized by treatment with an ion exchange or ion retardation material.

5. A method in accordance with claim 1 in which the xanthate is in the form of a solution produced by redissolving in an inert aqueous or non-aqueous medium a powder porduced by spray drying a solution of a polymeric alcohol xanthate decausticized by treatment with an ion exchange or ion retardation material.

6. A method in accordance with claim 1 in which the electrophilic reagent is an aldehyde, urea, amide, acyl halide, alkyl halide, aryl halide, or organosilyl halide.

7. A method in accordance with claim 1 in which the reaction is carried out in aqueous solution or dispersion.

8. A method in accordance with claim 1 in which the reaction is carried out in a non-aqueous solution or dispersion.

9. A method in accordance with claim 1 in which the reaction is carried out as a heterogeneous interfacial reaction.

10. A method in accordance with claim 1 in which the reaction is carried out and the reaction product formed on a substrate.

11. A method in accordance with claim 10 in which the substrate is a fibrous material.

12. A method in accordance with claim 4 in which the reaction is carried out by slurrying or dispersing the xanthate powder in a fluid medium containing the electrophilic reagent.

13. A method in accordance with claim 1 in which the xanthate is substantially free of nucleophilic impurities.

References Cited

UNITED STATES PATENTS

| | | | |
|---|---|---|---|
| 1,528,810 | 3/1925 | Zdanowich | 260—218 |
| 2,052,478 | 8/1936 | Lilienfeld | 260—218 |
| 2,123,493 | 7/1938 | Alles | 260—218 |
| 2,339,913 | 1/1944 | Hanford et al. | 260—218 |
| 2,396,957 | 3/1946 | Lazier et al. | 260—218 |
| 3,083,118 | 3/1963 | Bridgeford | 117—47 |
| 3,380,799 | 4/1968 | Elizer et al. | 162—157 |
| 3,399,069 | 8/1968 | Bridgeford | 260—217 |

FOREIGN PATENTS

| | | |
|---|---|---|
| 511,726 | 12/1926 | Australia. |
| 332,628 | 1930 | Great Britain. |
| 504,094 | 4/1939 | Great Britain. |
| 522,810 | 3/1956 | Canada. |

DONALD E. CZAJA, Primary Examiner

R. W. GRIFFIN, Assistant Examiner

U.S. Cl. X.R.

106—164, 198, 213; 117—139.5, 157; 260—91.3, 209, 218, 233.5